US012422792B1

(12) United States Patent
Schouwenaars-Harms

(10) Patent No.: US 12,422,792 B1
(45) Date of Patent: Sep. 23, 2025

(54) INDIVIDUAL MACHINE CONFIGURATION BASED ON OVERALL PROCESS PERFORMANCE AND LATENT METRICS

(71) Applicant: Amazon Technologies, Inc., Seattle, WA (US)

(72) Inventor: Bart Schouwenaars-Harms, Henley-on-Thames (GB)

(73) Assignee: Amazon Technologies, Inc., Seattle, WA (US)

( * ) Notice: Subject to any disclaimer, the term of this patent is extended or adjusted under 35 U.S.C. 154(b) by 444 days.

(21) Appl. No.: 17/330,213

(22) Filed: May 25, 2021

(51) Int. Cl.
G05B 13/04 (2006.01)
G05B 13/02 (2006.01)
H04L 41/08 (2022.01)
H04L 41/0803 (2022.01)
H04L 41/0859 (2022.01)

(52) U.S. Cl.
CPC ....... G05B 13/042 (2013.01); G05B 13/0265 (2013.01); H04L 41/08 (2013.01); H04L 41/0803 (2013.01); H04L 41/0859 (2013.01)

(58) Field of Classification Search
CPC .... G05B 13/04; G05B 13/042; G05B 13/048; G05B 13/047; G05B 13/0265; G05B 9/4099; G05B 23/0283; G05B 23/0281; G05B 13/027; G05B 2219/35021; G05B 2219/25255; B22F 10/85; B22F 10/00;
(Continued)

(56) References Cited

U.S. PATENT DOCUMENTS 7,035,240 B1 4/2006 Balakrishnan et al.
8,769,691 B1 7/2014 Hsueh et al.
(Continued)

FOREIGN PATENT DOCUMENTS

WO WO-2012112166 A1 * 8/2012 ......... G06Q 30/0201

OTHER PUBLICATIONS

Using Metric Time-Lines for Identifying Architecture Shortcomings in Process Execution Architectures Daniel Lübke 2015 IEEE/ACM 2nd International Workshop on Software Architecture and Metrics Year: 2015 | Conference Paper | Publisher: IEEE (Year: 2015).*
(Continued)

Primary Examiner — Scott B Christensen
(74) Attorney, Agent, or Firm — Robert C. Kowert; Kowert, Hood, Munyon, Rankin & Goetzel, P.C.

(57) ABSTRACT

Machine-level metrics for machines of a processing line, as well as latent metrics for results of the processing line, are obtained for the current time period. Machine configuration setting values for the machines during the current time period, as well as at the earlier time period are also obtained. Updates to current configuration setting values of the machines are determined based upon analysis of the machine-level metrics, the process-level metrics for the current time period, the latent metrics for the earlier time period, and the machine configuration setting values for the current and earlier time periods (e.g., the metrics and configuration values may be input to one or more machine learning models used to determine the updates to current configuration setting values for the individual machines). The current values may be changed to the updated values via an automated process or the updates presented as a recommendation report.

22 Claims, 6 Drawing Sheets

(58) Field of Classification Search
CPC .......... B22F 10/38; B22F 12/90; B22F 10/28; B22F 10/36; B22F 10/366; B33Y 50/02
USPC ...................................................... 709/221
See application file for complete search history.

(56) References Cited

U.S. PATENT DOCUMENTS

| | | | |
|---|---|---|---|
| 9,258,565 | B1 | 2/2016 | Jacob |
| 9,306,806 | B1* | 4/2016 | Zhang ................. H04L 41/0853 |
| 9,756,570 | B1 | 9/2017 | Ramachandra |
| 10,387,794 | B2 | 8/2019 | Okanohara et al. |
| 10,397,594 | B2 | 8/2019 | Jain et al. |
| 10,554,382 | B2 | 2/2020 | Khanna |
| 10,554,726 | B1 | 2/2020 | Mattison |
| 10,616,067 | B2 | 4/2020 | Khanna |
| 10,980,085 | B2 | 4/2021 | Kasaragod et al. |
| 2003/0110252 | A1 | 6/2003 | Yang-Huffman |
| 2005/0078672 | A1 | 4/2005 | Caliskan et al. |
| 2006/0036345 | A1* | 2/2006 | Cao ..................... G05B 13/027 702/182 |
| 2006/0200007 | A1 | 9/2006 | Brockway et al. |
| 2008/0065766 | A1 | 3/2008 | Motoyama et al. |
| 2009/0044263 | A1 | 2/2009 | Lingafelt et al. |
| 2009/0307277 | A1 | 12/2009 | Grubov et al. |
| 2010/0262269 | A1 | 10/2010 | Gladwin et al. |
| 2010/0332149 | A1 | 12/2010 | Scholpp |
| 2011/0030487 | A1 | 2/2011 | McRae |
| 2011/0200239 | A1 | 8/2011 | Levine et al. |
| 2012/0140302 | A1 | 6/2012 | Xie et al. |
| 2012/0208161 | A1 | 8/2012 | Takata et al. |
| 2012/0289790 | A1 | 11/2012 | Jain et al. |
| 2013/0021910 | A1 | 1/2013 | Crisan et al. |
| 2013/0063767 | A1 | 3/2013 | Morris et al. |
| 2014/0032495 | A1 | 1/2014 | Erofeev |
| 2014/0058986 | A1 | 2/2014 | Boss et al. |
| 2014/0115166 | A1 | 4/2014 | Kucharczyk et al. |
| 2014/0181891 | A1 | 6/2014 | Von Bokern et al. |
| 2014/0258513 | A1 | 9/2014 | Letca et al. |
| 2014/0266684 | A1 | 9/2014 | Poder et al. |
| 2014/0285813 | A1 | 9/2014 | Shi et al. |
| 2014/0330959 | A1 | 11/2014 | Zhang |
| 2015/0052247 | A1 | 2/2015 | Threefoot et al. |
| 2015/0120296 | A1 | 4/2015 | Stern et al. |
| 2015/0242760 | A1 | 8/2015 | Miao et al. |
| 2015/0281253 | A1 | 10/2015 | Lords et al. |
| 2015/0281401 | A1 | 10/2015 | Le et al. |
| 2015/0350018 | A1 | 12/2015 | Hui et al. |
| 2016/0012640 | A1 | 1/2016 | Abraham |
| 2016/0014008 | A1 | 1/2016 | Metts et al. |
| 2016/0028599 | A1 | 1/2016 | Vasseur et al. |
| 2016/0034253 | A1 | 2/2016 | Bang et al. |
| 2016/0050264 | A1 | 2/2016 | Breed et al. |
| 2016/0063393 | A1 | 3/2016 | Ramage et al. |
| 2016/0067864 | A1 | 3/2016 | Mullan et al. |
| 2016/0072891 | A1 | 3/2016 | Joshi et al. |
| 2016/0171371 | A1 | 6/2016 | Andrejko et al. |
| 2016/0182629 | A1 | 6/2016 | Korn |
| 2016/0188292 | A1 | 6/2016 | Carter et al. |
| 2016/0217388 | A1 | 7/2016 | Okanohara et al. |
| 2016/0248809 | A1 | 8/2016 | Smith et al. |
| 2016/0315922 | A1 | 10/2016 | Chew et al. |
| 2016/0380892 | A1 | 12/2016 | Mahadevan et al. |
| 2017/0034700 | A1 | 2/2017 | Cohen et al. |
| 2017/0078875 | A1 | 3/2017 | Muhanna et al. |
| 2017/0099353 | A1 | 4/2017 | Arora et al. |
| 2017/0109322 | A1 | 4/2017 | McMahan et al. |
| 2017/0139803 | A1 | 5/2017 | Maheshwari et al. |
| 2017/0195424 | A1 | 7/2017 | Nasir et al. |
| 2018/0018081 | A1 | 1/2018 | Dattilo-Green et al. |
| 2018/0032908 | A1 | 2/2018 | Nagaraju et al. |
| 2018/0034913 | A1 | 2/2018 | Matthieu et al. |
| 2018/0218085 | A1 | 8/2018 | Price et al. |
| 2018/0270271 | A1 | 9/2018 | Lee et al. |
| 2018/0285767 | A1 | 10/2018 | Chew |
| 2018/0309831 | A1 | 10/2018 | Sherman et al. |
| 2018/0316928 | A1 | 11/2018 | Jain et al. |
| 2018/0322333 | A1 | 11/2018 | Lacewell et al. |
| 2018/0336486 | A1 | 11/2018 | Chu et al. |
| 2018/0365580 | A1 | 12/2018 | Musuvathi et al. |
| 2018/0375720 | A1 | 12/2018 | Yang et al. |
| 2019/0042386 | A1* | 2/2019 | Barczak ................. G06F 3/0632 |
| 2019/0159044 | A1* | 5/2019 | Abou-Rizk ........... H04W 24/08 |
| 2019/0349266 | A1 | 11/2019 | Johnsson et al. |
| 2020/0050918 | A1 | 2/2020 | Chen et al. |
| 2020/0074523 | A1 | 3/2020 | Wang et al. |
| 2020/0128077 | A1 | 4/2020 | Yu et al. |
| 2020/0195495 | A1* | 6/2020 | Parker ................... H04L 41/082 |
| 2020/0372403 | A1* | 11/2020 | Kursun ................. G06F 21/577 |

OTHER PUBLICATIONS

Eaton, "How Dynamic Machine Control opens a smarter future with industrial valves", Retrieved from https://www.eaton.com/us/en-us/services/dynamic-machine-control/dmc-articles/how-dynamic-machine-control-opens-a-smarter-future-with-industrial-valves.html on May 25, 2021, pp. 1-5.
U.S. Appl. No. 16/779,330, filed Jan. 31, 2020, Aran Khanna.
U.S. Appl. No. 15/635,148, filed Jun. 27, 2017, Aran Khanna
U.S. Appl. No. 17/227,194, filed Apr. 9, 2021, Sunil Mallya Kasaragod et al.
U.S. Appl. No. 15/660,859, filed Jul. 26, 2017, Sunil Mallya Kasaragod et al.
F. Liu, et al., A Survey on Edge Computing Systems and Tools, in Proceedings of the IEEE, vol. 107, No. 8, Aug. 2019, doi: 10.1009/JPROC.2019.2920341., pp. 1537-1562.
S. Mohamed, et al., Automatic Generation of Distributed Run-Time Infrastructure for Internet of Things, 2017 IEEE International Conference on Software Architecture Workshops (ICSAW), 2017, doi: 10.1109/ICSAW.2017.51, pp. 100-107.

\* cited by examiner

INDIVIDUAL MACHINE CONFIGURATION BASED ON OVERALL PROCESS PERFORMANCE AND LATENT METRICS

BACKGROUND

Machines of a production line or facility may be configurable. Configuration settings for the machines are generally adjusted to optimize the performance of the particular machine, irrespective of the impact of the settings for one particular machine on another machine in the production line. While configuration settings for some machines in some production lines may be adjusted with regard to another machine in the production line (e.g., the output speed of one machine may be adjusted to be similar to an input processing speed for a downstream machine) such adjustments are generally limited to the next proximate machine, without taking into account the performance of the overall process, to say nothing of latent characteristics of the output of the overall process.

In some systems, configuration settings for some machines may be set based on human intuition (e.g., speeding up processing of one machine should improve the performance of the production line overall). But such intuition-based configurations of a particular machine are not based on data-driven analysis of the overall performance of the production lines and fail to account for counter-intuitive outcomes.

Figure 1:
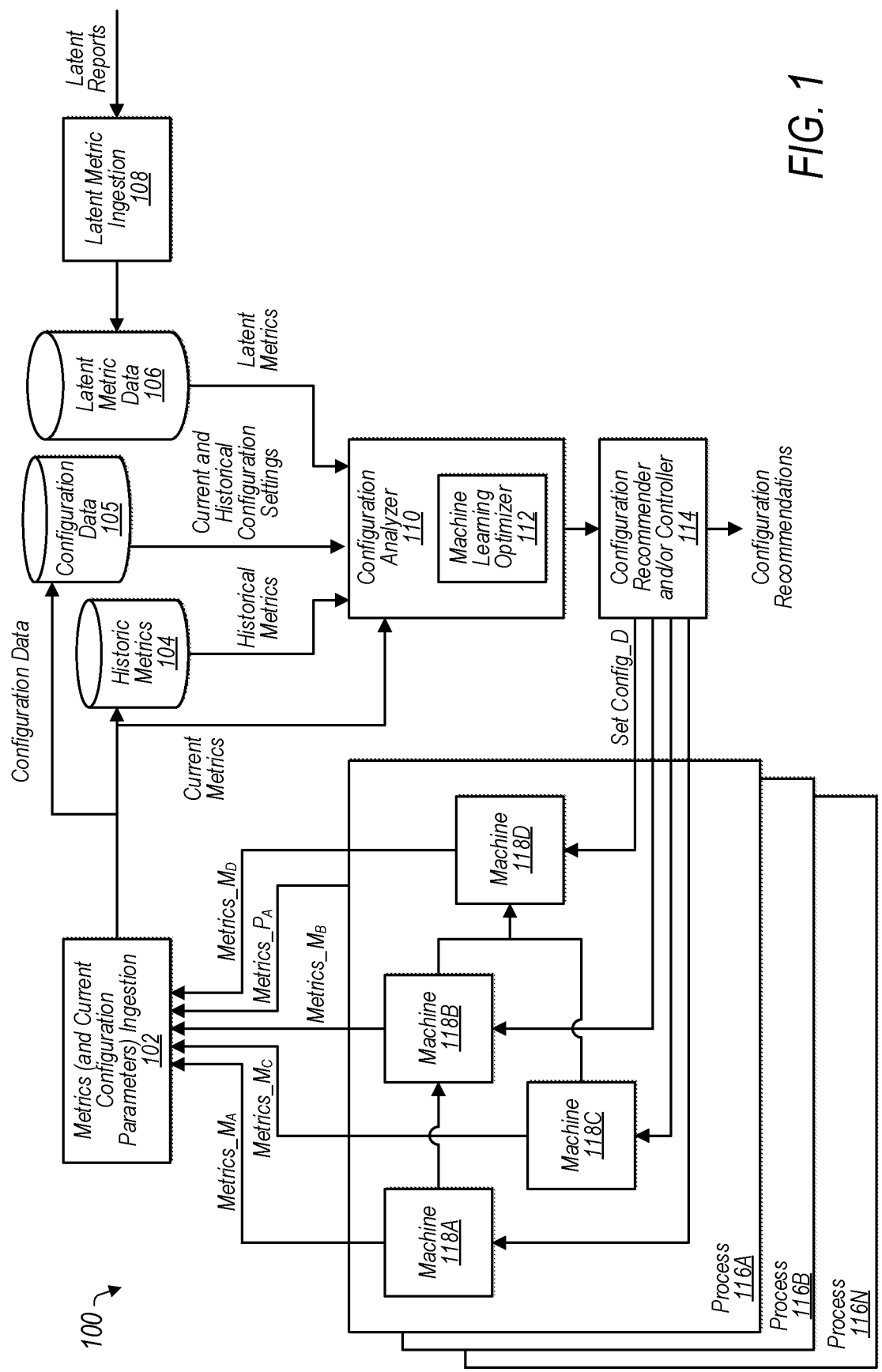
FIG. 1 is a block diagram that illustrates components of a system that implements individual machine configuration based on overall process performance and latent metrics, according to some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. Headings used herein are for organizational purposes only and are not meant to be used to limit the scope of the description.

DETAILED DESCRIPTION OF EMBODIMENTS

As discussed below, various embodiments of systems that implement individual machine configuration based on overall process performance and latent metrics are disclosed. A group of machines perform tasks related to a common result. The machines may work together in series or in parallel, or various combinations thereof. Individual ones of the machines may be configured with values for settings that configure the device to act or perform a process in a particular way. Changes to the values for the settings may alter the performance of the individual machine. The performance of one machine may affect the result of the overall process performed by the group of machines.

For some systems, individual machines may be configured to maximize or minimize some characteristic of that individual machine's contribution to the result of the overall process (e.g., maximize a number of widgets or data objects processed by that individual machine per unit of time). Configuration of individual ones of the group of machines with respect to the overall system performance can be complex and is often not be considered, or when considered may be based on intuition, rather than based on data-driven analysis.

Disclosed herein are embodiments of a system for individual machine configuration based on analysis of multiple different types of data, such as data indicative of past and present performance of the overall process, including analysis of latent metrics—metrics that may not be available, obtainable, or known at the time of, or soon after processing, but that may become available, obtainable or knowable subsequent to the processing of the machines. Non-exhaustive examples of latent metrics (sometimes referred to as metrics data, herein) include latent qualities or defects of results of the process, such as a defect in a product or defect in processed data or data output.

In embodiments, a data-driven analysis of the overall performance of the production line can uncover counter-intuitive, beneficial configuration settings (sometimes referred to as configuration values, herein) for individual machines. In at least one instance, a data-driven analysis, using the techniques described herein (for example, but not limited to, one or more machine-learning techniques) determined that reducing a speed of one machine in the production line resulted in an overall production increase of the production line for the month—a counter-intuitive outcome. Thus, application of at least some of the techniques and data analysis herein determined an other-wise hidden pattern in the data that associated a counter-intuitive configuration setting with improved performance.

In at least some embodiments, analysis of certain types of data (for example, but not limited to, latent feedback in combination with metrics and/or configuration settings at the time of production that contributed to the latent feedback) can also determine beneficial, counter-intuitive configurations settings for individual machines. In embodiments, some such counter-intuitive configurations settings would go undiscovered without the disclosed data-driven analysis described throughout this document.

In embodiments described herein, a process may include application of machine learning algorithms to build a model based on sample data, known as training data, in order to make predictions or decisions without being explicitly programmed to do so. In embodiments, computers learn from input data and then carry out certain tasks. For example, some combination of current and historic metric data, configuration data, and/or latent metric data may be input into a machine learning model, and then the model used to determine configuration setting values for updating individual machine configuration settings. Some embodiments use a trained machine learning (ML) model to determine which configurations of a particular machine maximize or minimize latent metrics under current conditions indicated by non-latent metrics.

Any of various types of machines are contemplated, such as but not limited to industrial machines, fulfillment center machines, hospital machines, commercial machines, transportation machines, food processing machines, or the like. In some embodiments, the machines may include various arrangements of computing devices (e.g., storage or compute-based computing devices) that work together to achieve a result, such as performing a computationally-intensive process to obtain a result.

Output of the machine learning model may include recommended configuration settings for individual machines. The output may be produced as a report or sent directly to the machines to update the configuration settings of the machine, in an automated fashion. In embodiments, transmitting the updates to the current configuration setting values to a specified destination may include transmitting a recommendation report for the updates to a specified destination, and/or transmitting the updates to a configuration controller that sets configuration values (sometimes referred to as settings, herein) for the machines, and/or transmitting the updates directly to the devices for which the updates are determined. A destination may be specified via an interface of the system configured to accept input from an operator (e.g., a user of a client device). Non-exhaustive examples of destinations include the device to be configured with the updated settings, client devices of a customer of a multi-tenant service provider network that provides the techniques described herein as a service to various distinct client networks, e-mail contact points of system stakeholders, administrators, machine operator or managers, or other points of contact.

Figure 2:
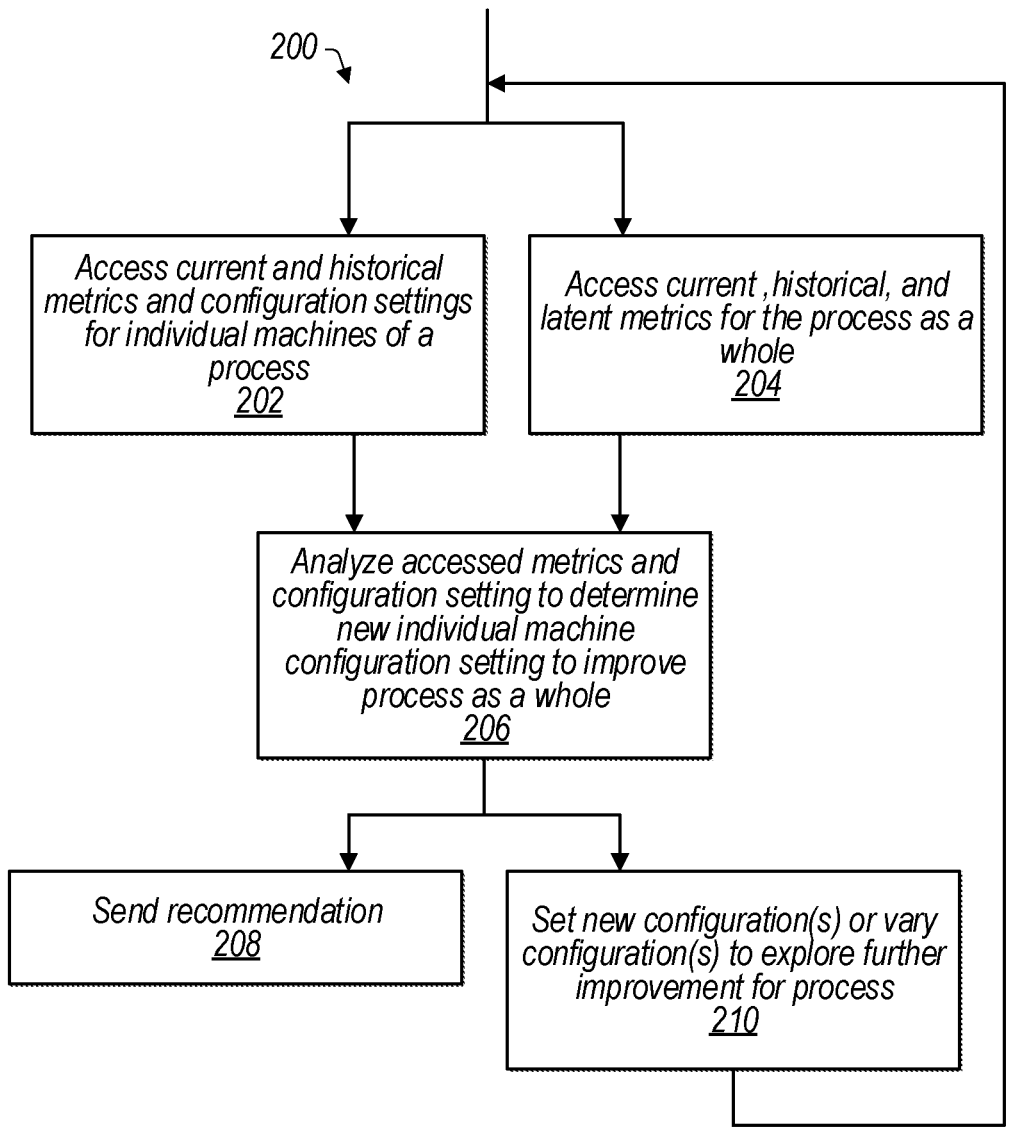
FIG. 2 is a process diagram illustrating a technique for individual machine configuration based on overall process performance and latent metrics, according to some embodiments.
Figure 3:
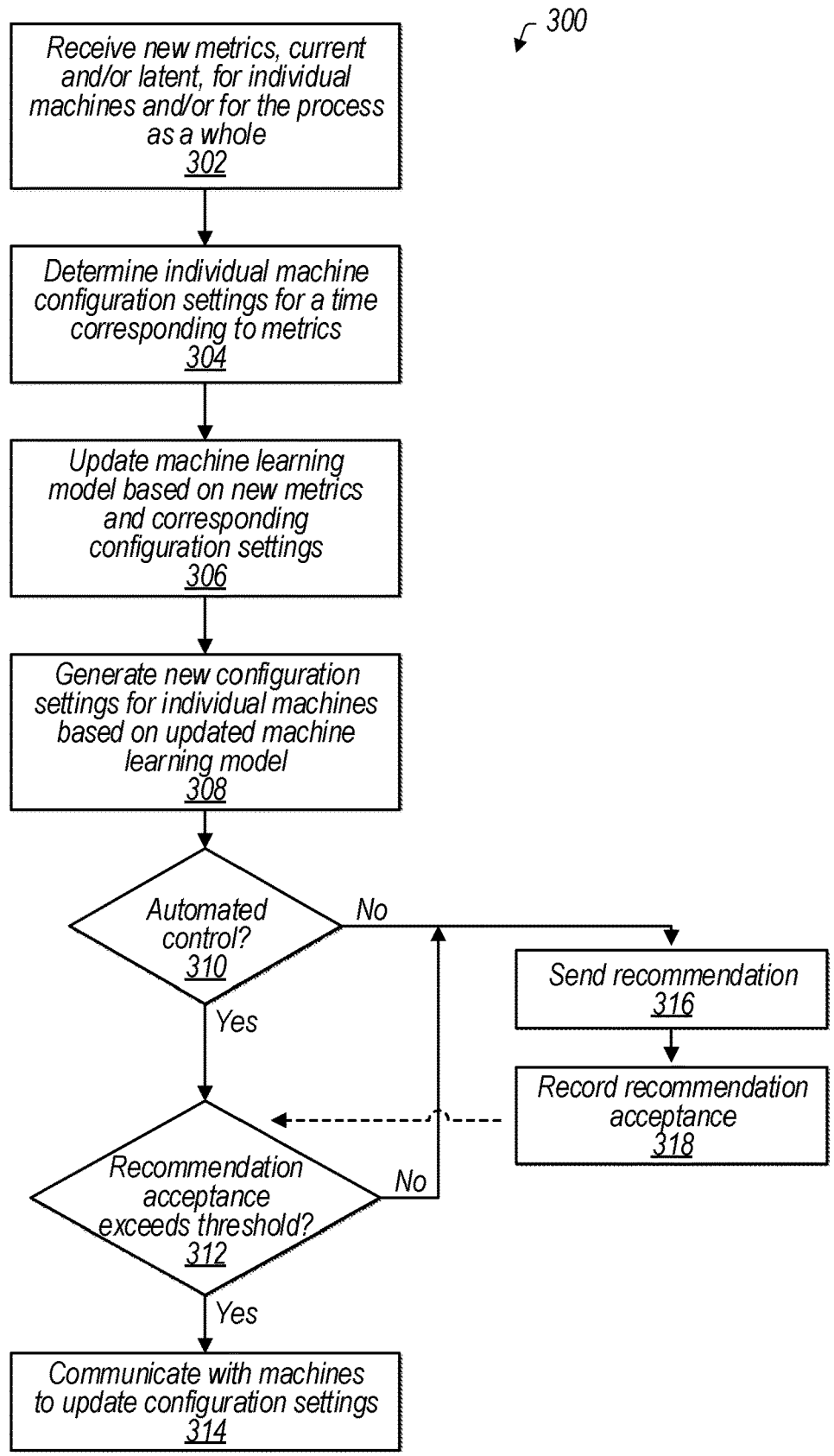
FIG. 3 is a process diagram that illustrates a technique for individual machine configuration based on overall process performance and latent metrics, according to some embodiments.

FIGS. 1 and 4-6 are block diagrams illustrating various embodiments of architectures of components of a system that implements individual machine configuration based on overall process performance and latent metrics. FIGS. 2 and 3 are process diagrams that illustrate various functionality that may be performed by various of the components illustrated in block diagrams 1 and 4-6. Components illustrated in FIGS. 1 and 4-6 are described, below, as performing various aspects of the functionality illustrated in FIGS. 2 and 3. Such examples are illustrative and non-limiting. For example, different components may perform different parts of the functionality, the functionality may be performed in different sequence than depicted, and/or some functionality may be omitted, in some embodiments, etc.

FIG. 1 is a combined block/data flow diagram that illustrates components of a system 100 that implement individual machine configuration based on overall process performance and latent metrics, according to some embodiments. Process 116A is illustrated with Machines 118A, 118B, 118C and 118D. Process 116A is intended broadly and a non-exhaustive list of example processes includes a fulfillment center processing line, an industrial manufacturing line, a food processing line, other industrial or commercial process, etc. The processing may be performed in diverse contexts, such as machinery for processing cheddar cheese, and obtaining latent metrics may include obtaining the latent metrics after months of aging of the cheese, or in another example, receiving feedback from customers of a fulfillment service that boxes created during a process over a period of time are not staying glued together during shipment.

The quantity of Machines 118A-118D in the processing line 116A is illustrative and processing lines with more or fewer machines (sometimes referred to as equipment or devices, herein), dependent upon one another or independent of one-another are contemplated, in embodiments. The type of machines may vary, for example, Machines 118A-118C may each perform various processing tasks associated with processing items, products, or the like, and Machine 118D may perform an inspection of the items, products or like. Example types of machines include, but are not limited to various commercial and/or manufacturing machines, picking machines, sorting machines, packing machines, labeling machines, robots, etc. In some embodiments, Machines 118A-D may have accompanying sensors and, in some embodiments, one or more of Machines 118A-D may be a sensor (e.g., an environmental sensor for the overall process environment or a sensor more closely associated with a particular machine). The machines may be arranged into a processing line, in embodiments. Processes 116B and 116N are also illustrated and may include various arrangements of machines, in embodiments. In some instances, the output of process 116A may feed into process 116B and the output of process 116B may feed into process 116N. For example, the arrow from Machine 118A to Machine 118B illustrates that the output of Machine 118A is an input into Machine 118B. Output of Machines 118B and 118C are illustrated as inputs to Machine 118D. Various embodiments may include more or fewer processing lines 116A-116N. Machines 118A-118D may be pre-configured with an initial set of configuration settings for startup of the processing line 116A and the configuration settings for one or more of the Machines may be set (e.g., sometimes referred to as configuration setting data being updated or adjusted, over time, herein).

Machines 118A-118D are illustrated as each producing respective Metrics MA, MB, Mc, MD, values of the metrics associated with respective Machines 118A-118D (e.g., sometimes referred to as machine-level metrics). Non-exhaustive examples of machine-level metrics include an output rate of one or more of the machines, an output quality for one or more of the machines, an operating condition for one or more of the machines, or an environmental condition at one or more of the machines.

Metrics $P_A$ for the overall Process 116A are illustrated, as well. Non-exhaustive examples of process-level metrics include an output rate for the process as-a-whole, an output quality for the process as-a-whole, or an environmental condition for the process as-a-whole.

The Machine-level metrics $M_A$- $M_D$ and/or Process-level metrics $P_A$ are illustrated as being ingested at a Metrics (and Current Configuration Parameters) Ingestion System Component 102. Current configuration parameters (sometimes referred to herein as configuration setting data) may also be ingested via Ingestion System Component 102, although embodiments where the current configuration parameters are obtained via other channels are also contemplated (e.g., via operator input to a system interface). Such an ingestion component may aggregate data from various different machines of the process (as illustrated) or each machine may provide metrics and configuration data to a respective ingestion component, in embodiments. In embodiments, the metrics data are received via one or more network connections to one or more sensors.

FIG. 1 illustrates that the configuration parameters obtained from the Machines 118A-D may be transmitted (e.g., streamed or otherwise) to Configuration Data Repository 105 for storage. In embodiments, the historical configuration settings are stored in the Configuration Data Repository 105, the historical settings (and/or updates) may be stored with an indication of a time associated with the updates to the configuration settings. A time associated with a particular configuration setting may be used in analysis of the data to match data for a latent metric of a result produced at or near-to the time, in embodiments.

FIG. 1 illustrates that Latent Reports may be received at Latent Metric Ingestion Component 108 and stored to Latent Metric Data Repository 106. Non-exhaustive examples of sources of latent metrics may include customer reports about poor packing (e.g., wrapping machine and/or shipping label processing line defects), feedback from a next manufacturer that used a product created via the process, feedback about food quality of food processed and/or packaged via the process 116A, etc. In embodiments, one or more of the latent metrics describe one or more latent qualities or defects of the one or more results of the process.

In embodiments, the latent metric data may be used to determine counter-intuitive configuration settings for an individual machine or device. The data analysis may uncover non-intuitive patterns, such as a long-term pattern that went unnoticed by the operator of a machine for a particular shift. For example, some such data analysis has revealed that by reducing one machine's production by 5%, the overall processing line has gained more than 5% in overall efficiency for the month. Data analysis, such as that disclosed herein may determine that the overall reduction in down-time for a machine operated at less than maximum capacity may result in greater production over time for the entire processing line 116A, for example.

FIG. 1 illustrates that a Configuration Analyzer 110 (illustrated with Machine Learning Optimizer 112) takes various inputs (e.g., some combination of current metrics, historical metrics, current and/or historical configuration settings and/or latent metrics) as part of the machine learning-based analysis. In embodiments, the Configuration Analyzer 110 accesses (e.g., via one or more data access APIs) the configuration data repository 105 to determine machine configuration setting values for the machines during the current time period and at some earlier time period (e.g., such as an earlier time period of processing by process 116A that produced one of the latent defects. In embodiments, the Configuration Analyzer 110 accesses (e.g., via one or more data access APIs) the machine-level metrics data and/or the process-level metrics data for the current time period, the latent metrics data for the earlier time period, and the machine configuration setting values for the current and earlier time periods and uses the accessed data as input to one or more machine learning models to determine updates to current configuration setting values for individual ones of the of machines 118A-118D of process 116A. FIG. 1 illustrates that the Configuration Analyzer 110 transmits the updates to the current configuration setting values to one or more specified destinations, such as the Configuration Recommender and/or Controller 114 in the illustrated embodiment, which may transmit the updates in a configuration recommendation report or transmit the updates to the machines to set the configuration of Machines 118A-118D (illustrated at "Set Config_D in FIG. 1, for example).

FIG. 2 is a process diagram illustrating a technique for individual machine configuration based on overall process performance and latent metrics, according to some embodiments. The illustrated process 200 may be performed by components illustrated in FIGS. 1 and 4-6, in embodiments, such as by Configuration Analyzer 110 and/or Machine Learning Optimizer 112. Generally, FIG. 2 illustrates obtaining various different types of metric data and configuration setting data, analyzing the data to determine updated configuration settings, and performing some useful act with the determined configuration settings.

In FIG. 2, at block 202, current and historical metrics and configuration settings for individual machines are accessed (sometimes referred to as obtained or received, herein), by Configuration Analyzer 110 from repositories 104 and/or 105. The metrics and/or configuration settings may be obtained via either push or pull-based models, in embodiments. For example, in FIG. 1, configuration settings are obtained (e.g., pulled) from Configuration Data Repository 105 and Current Metrics may be pushed directly to Configuration Analyzer 110 from the Ingestion Component 102 or sent to Historic Metrics Repository 104, where the metrics may be pulled by Configuration Analyzer 110 (e.g., via a data storage API or the like). In embodiments, the metrics data are received over an Internet connection to a hub device that collects the metrics data from the plurality of sensors. In embodiments, the latent metrics are received from a source remote from the plurality of machines and process, such as from a customer feedback website, a downstream industrial process at another location, etc.

At block 204, current, historical, and latent metrics for the process as a whole are accessed, by Configuration Analyzer 110 from Latent Metric Data Repository 106, for example, via either push or pull-based models, in embodiments. Blocks 202 and 204 illustrate that the access to the various types of data may be performed in parallel, in at least the illustrated embodiment. Access may be non-parallel, in embodiments.

At block 206, the accessed metrics and configuration settings are analyzed to determine new individual machine configuration settings to improve the process as a whole. Various types of analysis are contemplated, such as machine learning-based analysis, statistical analysis, data mining, or the like. In embodiments, a computer program is said to learn from experience E with respect to some class of tasks T and performance measure P if its performance at tasks in T, as measured by P, improves with experience E. Machine learning techniques may have two objectives, one is to classify data based on models which have been developed, the other purpose is to make predictions for future outcomes based on these models. In a particular example the analysis includes determining a configuration setting for an individual device by solving a linear program (LP) to maximize or minimize an overall machine-based process characteristic, even when the determined setting is non-optimal for performance of the particular machine, in embodiments. Particular types of supervised learning algorithms that may be used as described herein include active learning, classification and regression, as non-exhaustive examples, although unsupervised or semi-supervised learning may be applied, in embodiments.

At block 208, a recommendation including the new individual machine configuration settings is generated and sent, (e.g., by Configuration Recommender and/or Controller 114). For example, the Configuration Recommender and/or Controller 114 may receive the updates from Configuration Analyzer 110, generate a report based on the updates and then send recommendation over an electronic network to one or more specified destinations. The destinations may have been specified at some point prior to or during operation of the system, such as when the system was configured or initialized. In some embodiments, a customer or client may update the specified destinations via a console for such updates. Block 210 illustrates that the new updated configurations may be set on the devices (e.g., in an automated process carried out by the Configuration Recommender and/or Controller 114). Block 210 also illustrates that the current configurations of the machines may be varied to explore further improvements to the process. For instance, current configuration of one machine may be varied and the latent metrics analyzed, as described above) to determine improvements or degradations to the overall performance of the process. Various features of blocks 208 and 210 may be mixed and matched. For example, a recommendation to vary the configuration settings may be sent, or the variations of the configurations may be performed via an automated process.

In some embodiments, a technique similar to that illustrated in FIG. 2 may be repeated for subsequent time periods (for ongoing process improvement, and/or for ongoing updating of the machine-learning models or the like). In embodiments, it may be determined (by the system or otherwise, such as by an administrator viewing a report) that updates to the configuration values have failed to improve the process (or failed to reduce errors) and the model(s) may be retrained. For example, as described herein, the configuration setting values for the machines may be updated for subsequent time periods, and stored (e.g., to the historic metrics data store 104). Metrics data for the one or more subsequent time periods may be received (e.g., to latent metric data store 106). A determination to retrain the one or more machine learning models may be made, (e.g., by the configuration analyzer 110, based on the received configuration setting values in combination with performance of the machines in view of the corresponding latent metrics, by an administrator, based on a report about the latent metrics, or otherwise). Retraining of the one or more machine learning models may be triggered (e.g., retraining may be triggered manually by an administrator via an administrator interface for the system, or automatically by the configuration analyzer 110 based on a determination that data, such as latent metric data indicates the updates have failed to improve operation of the machines, or based one some duration of time having passed, etc., in embodiments.). In some embodiments, updates to a machine learning model may be based on some combination of the previous machine configuration setting values and/or the latent metrics data to produce an updated machine learning model, or based on other data. For example, the model(s) may be trained using some such data. In some embodiments, the system may automatically trigger retraining of the model(s) based on repeated failures of a series of updated configuration values to achieve positive system outcomes with regard to the system output (e.g., based on a failure to improve the output product, or based on a failure to reduce errors, etc.). In some embodiments, the system may trigger retraining of the model(s) based on a failure of a threshold number of updates to the configuration values to achieve a threshold level of improvement, for example. The system may determine, based on one or more retrained machine learning models, one or more new updates to current configuration setting values for the plurality of machines, as described herein. The system may transmit the new updates to the current configuration setting values to one or more specified destinations (e.g., to the machines directly, to a machine operator, as a report for output, etc.).

FIG. 3 is a process diagram that illustrates a technique for individual machine configuration based on overall process performance and latent metrics, according to some embodiments. The process 300 may be performed by one or more components illustrated in FIGS. 1 and 4-6, in embodiments, such as by some combination of Configuration Analyzer 110, and Configuration Recommender and/or Controller 114.

At block 302, new metrics, current and/or latent, are received for individual machines and/or for the process as a whole. Individual machine configuration settings for a time corresponding to the metrics are determined (block 304). For instance, the individual machine configuration settings received by Metrics and Current Configuration Parameters Ingestion Component 102 and stored to Configuration Data Repository 105 may be received along with an indication of a time (or a timestamp may be added by Metrics and Current Configuration Parameters Ingestion Component 102 at the time of receipt) and the time stored with the configuration setting parameters. Metrics may be received and/or stored with an indication of a time associated with the metrics, in embodiments.

At block 306, one or more machine learning models are updated based on the new metrics and the corresponding configuration settings, by machine learning optimizer 112, for example. New configuration settings (new values) for individual machines are generated, based on the updated learning model (block 308) by machine learning optimizer 112, for example.

The new configuration settings may be used variously. In embodiments, the computers that implement the system 100 may access an acceptance history of previous updates to machine configuration setting values determined by the one or more machine learning models and determine whether the acceptance history meets an acceptance threshold. Transmission of the updates to the current configuration setting values to the one or more specified destinations may be performed responsive to the acceptance history meeting the acceptance threshold and may cause configuration settings for one or more of the plurality of machines to be updated automatically. For example, in a system that supports automatic updates to machine configuration settings if it is determined that automation is being implemented (block 310, yes), the system may determine whether a recommendation acceptance quantity exceeds a threshold (block 312). For instance, a system may be configured such that a machine operates in accordance to an initial configuration setting values, and that an operator is required to manually accept or make the updates to the setting for at least some threshold number of updates. Once the threshold has been reached (block 312, yes), the system may then skip the manual acceptance and directly communicate with the machines to update the individual machine configuration settings (block 314). If the recommendation acceptance threshold has not been met (block 312, no) or if control is not automated (block 310, no) a recommendation of the updated configuration values is sent (block 316) and a record of the recommendation acceptance recorded (block 318). The dashed line in FIG. 3 indicates that each recording of the recommendation acceptance may count towards meeting the recommendation acceptance threshold in block 312). In some embodiments, whether or not the update is applied in an automated manner is based on a size of the change to the configuration setting value. For instance, changes within some percentage threshold of the current value may be updated automatically while changes greater than the percentage threshold may require acceptance of the recommended update.

Figure 4:
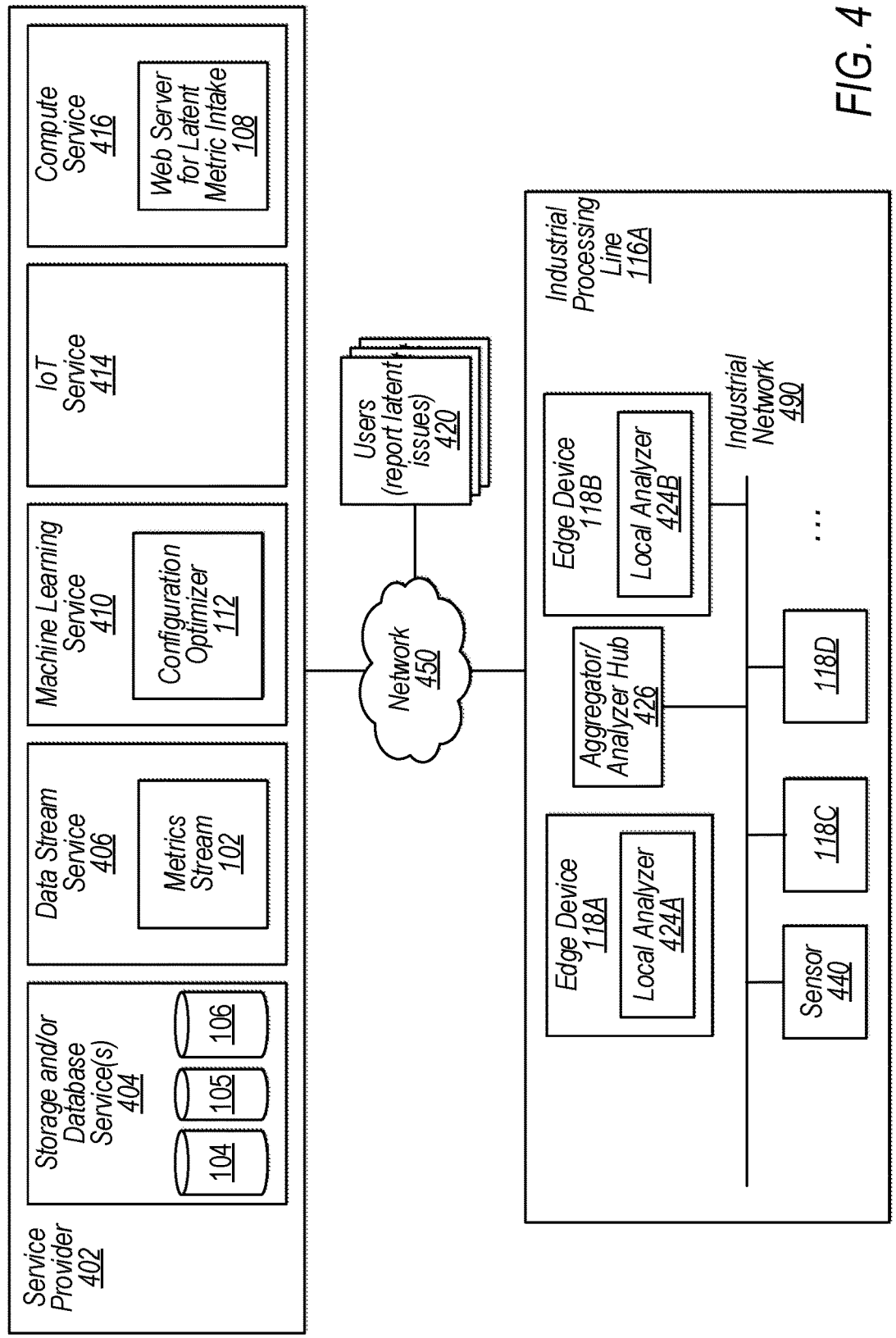
FIG. 4 is a block diagram that illustrates a service provider-based architecture for a system that implements individual machine configuration based on overall process performance and latent metrics, according to some embodiments.

FIG. 4 is a block diagram that illustrates a service provider-based architecture for a system 400 that implements individual machine configuration based on overall process performance and latent metrics, according to some embodiments. Some combination of the features illustrated in FIG. 4 may implement various of the functionality illustrated in FIGS. 2-3, in embodiments.

Multi-tenant service provider 402 is illustrated as connected to an industrial network 490 of an industrial processing line 116 via network 450 (e.g., a service provider network or an external network). The service provider 402 may be connected to multiple different industrial networks for various different clients of the service provider, in embodiments.

Service provider 402 is illustrated as providing multiple different types of services 404-416 that may be used as building blocks for building applications or services used by service provider customers or provided by service provider customers to other entities. For example, Service Provider 402 is illustrated as providing Storage and/or Database Service(s) 404 and Historic Metrics Repository 104, Configuration Data Repository 105 and Latent Metric Repository 106 are illustrated as being implemented by the Service Provider Storage Service(s) 404. Example storage services include, secure, durable, and scalable object storage infrastructure; scalable, shared file storage service; and persistent, durable, low-latency block-level storage; as well as various types of database storage such as QLDB—a managed ledger database.

Service provider 402 is illustrated as providing a Data Stream Service 406 (e.g., a scalable and durable real-time data streaming service) and Metrics Stream 102 may be built on such a service. In embodiments, metrics data from a plurality of sensors at respective ones of the plurality of machines or the process are received at the data stream storage service 406, the data stream is parsed to load the machine-level and process-level metrics into a metrics repository 104.

FIG. 4 illustrates that service provider 402 may provide a Machine Learning Service 410 and that Configuration Optimizer 112 may be built based on such a service. Service provider 402 is illustrated as providing an Internet of Things (IoT) service 414 as well as a Compute Service 416 (which may be used to implement a Web Server for Latent Metric Intake 108) in embodiments.

FIG. 4 illustrates that client devices 420 of users external to the Service Provider may report latent issues via network 450.

FIG. 4 illustrates an Industrial Processing Line 116A with Machines 118A-118D (two of whish are referred to as Edge Device 118A, Edge Device 118B that have Local Analyzers 424A and 424B for this example), sensor 440, and Aggregator/Analyzer Hub 426.

Non-exhaustive examples for sensor 440 include an ambient light sensor (e.g., data from which may be used to increase a bar code scanner light), an ambient temp sensor (data from which may be used to change glue temperature for gluing boxes together), a glue temperature sensor, a humidity sensor, etc.

In the illustrated embodiment, the Machines 118A and 118B are equipped with or connected to or associated with respective Local Analyzers 424A and 424B. The Analyzers 424A/B may implement various portions of the functionality illustrated in FIGS. 2-3, in embodiments. Local Analyzers 424 may seamlessly extend the functionality of the Service Provider network to edge devices 118 so the edge devices can act locally on the data they generate, while still using the cloud for management, analytics, and durable storage, in embodiments. For example, Local Analyzers 424A/B may obtain the configuration and metric data from the Edge Device 118A/B, enrich the data (e.g., adding metadata or tags to the data obtained from the machine such as labeling a temperature as Fahrenheit or Celsius, as a non-limiting example), aggregate the data and metadata and transmit the data and metadata to Hub 426, or to Data Stream Service 406 or to IoT Service 414, in embodiments. In some embodiments, Local Analyzer 424A may download a machine learning model generated by the Machine Learning Service 410 and locally process data at the Edge Device 118A to determine configuration settings for that particular device (e.g., based at least in part on latent metrics obtained from user devices 420, or from Latent Metrics Repository 106. The determined configuration settings may be presented to an operator of the Device 118A or may used to automatically update the settings of the Device 118A, in embodiments, the Local Analyzer 424A may transmit the updated configuration settings to storage 105, or store a history of the configuration settings locally, in various embodiments. Similar processing and/or storage may be performed for the metrics associated with the Device 118A. Aggregator/Analyzer Hub 425 may perform similar processing and/or share storage and or processing load with the Local Analyzers 424. Various different architectures may move functionality illustrated in FIGS. 2-3 more towards the Edge Devices 118 or more towards the Aggregator/Analyzer Hub 426 or more toward the Service Provider Service(s) 402-416, in various different embodiments. For example, a Local Analyzer 424A may do real-time or near-real-time analysis using local-to-the device or local-to-the-industrial network data. or may analyze with data from other devices, or may analyze based on downloaded latent metrics from a service provider 402.

Performing a process similar to that illustrated in FIGS. 2-3 as a service for a plurality of different processes employing different pluralities of machines. For example, a Service Provider 402 may perform a process similar to that illustrated in FIGS. 2-3 for individual ones of a number of distinct customers that each have their own production line(s) or computing system(s), or other group of machines that produce a product or result.

Figure 5:
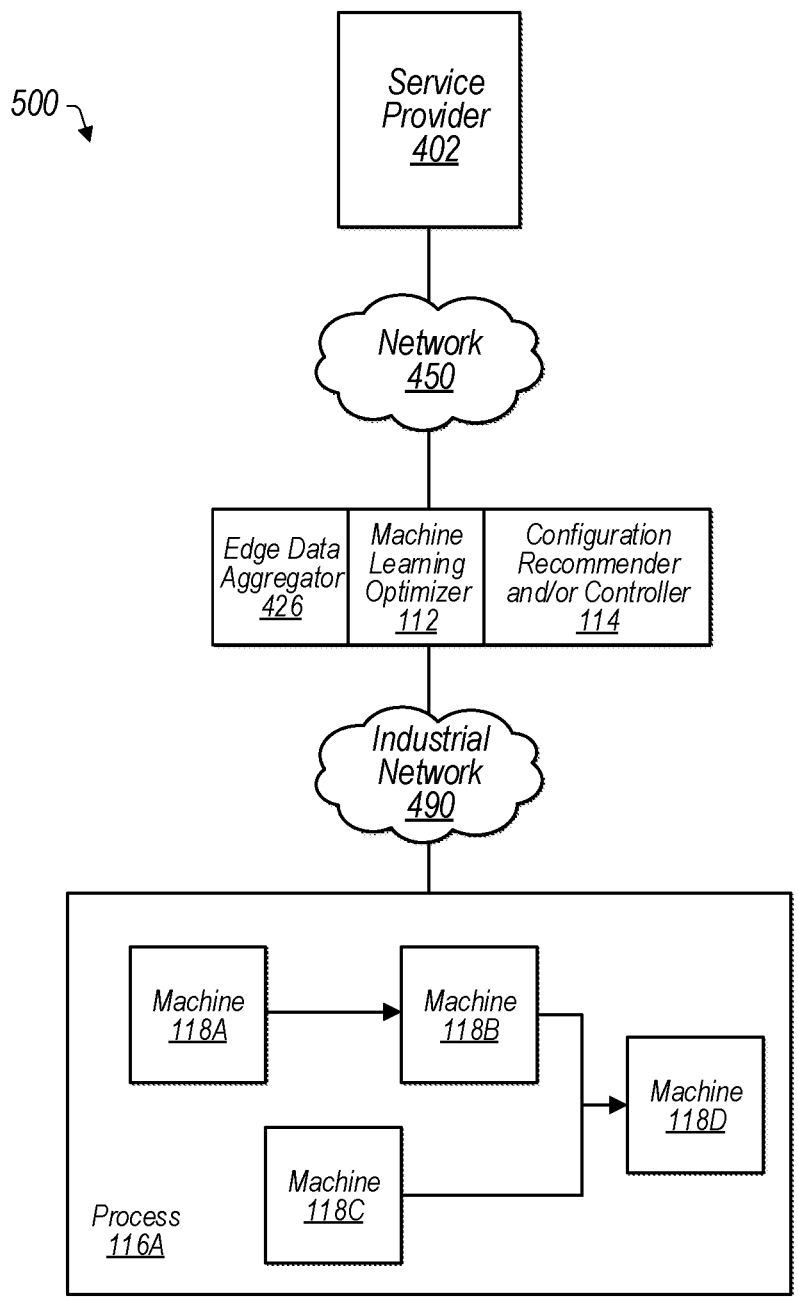
FIG. 5 is a block diagram of a particular architecture for a system that implements individual machine configuration based on overall process performance and latent metrics, according to some embodiments.

FIG. 5 is a block diagram of a particular architecture 500 for a system that implements individual machine configuration based on overall process performance and latent metrics, according to some embodiments.

FIG. 5 illustrates Service Provider 402 in relationship over network 450 with Edge Aggregator 426, Machine Learning Optimizer 112 and Configuration Recommender and/or Controller 114 that are connected to an industrial network 490 to which machines 118A-118D of process 116A are also connected. Service Provider 402 may be connected to various other industrial networks, in embodiments.

In the illustrated embodiment, functionality illustrated in FIGS. 2-3, described above is implemented by one or more devices that implement Edge Aggregator 426, Machine Learning Optimizer 112 and Configuration Recommender and/or Controller 114. In some embodiments, Edge Aggregator 426, Machine Learning Optimizer 112 and Configuration Recommender and/or Controller 114 may be implemented on a single device on the industrial network 490 (e.g., an edge hub device like 426). In other embodiments, one or more of Edge Aggregator 426, Machine Learning Optimizer 112 and Configuration Recommender and/or Controller 114 may be implemented on respective devices, separate from the other components. As described above for multiple embodiments, Machines 118A-118D act together to perform some process, illustrated by the arrows. Configuration data for, and metric data about, the Machines are gathered (e.g., via industrial network 490, or via some other network) and stored (e.g., at Edge Data Aggregator 426 or to a storage service of service provider 402). Machine Learning Optimizer 112 downloads a machine learning model from the service provider 402 and analyzes metrics and configuration settings to determine new individual machine configuration setting to improve process as a whole. Configuration Recommender and/or Controller may either generate and transmit a report indicating the new settings, or may automatically update the configurations of the Machines 118A-118D with the new individual machine configuration settings (e.g., over network 490). In embodiments, Machine Learning Optimizer 112 may update one or more machine learning models itself with new data from the service provider or from the machines 118A-D of process 116A, or may download updated models from service provider 402.

Example Computer System

Figure 6:
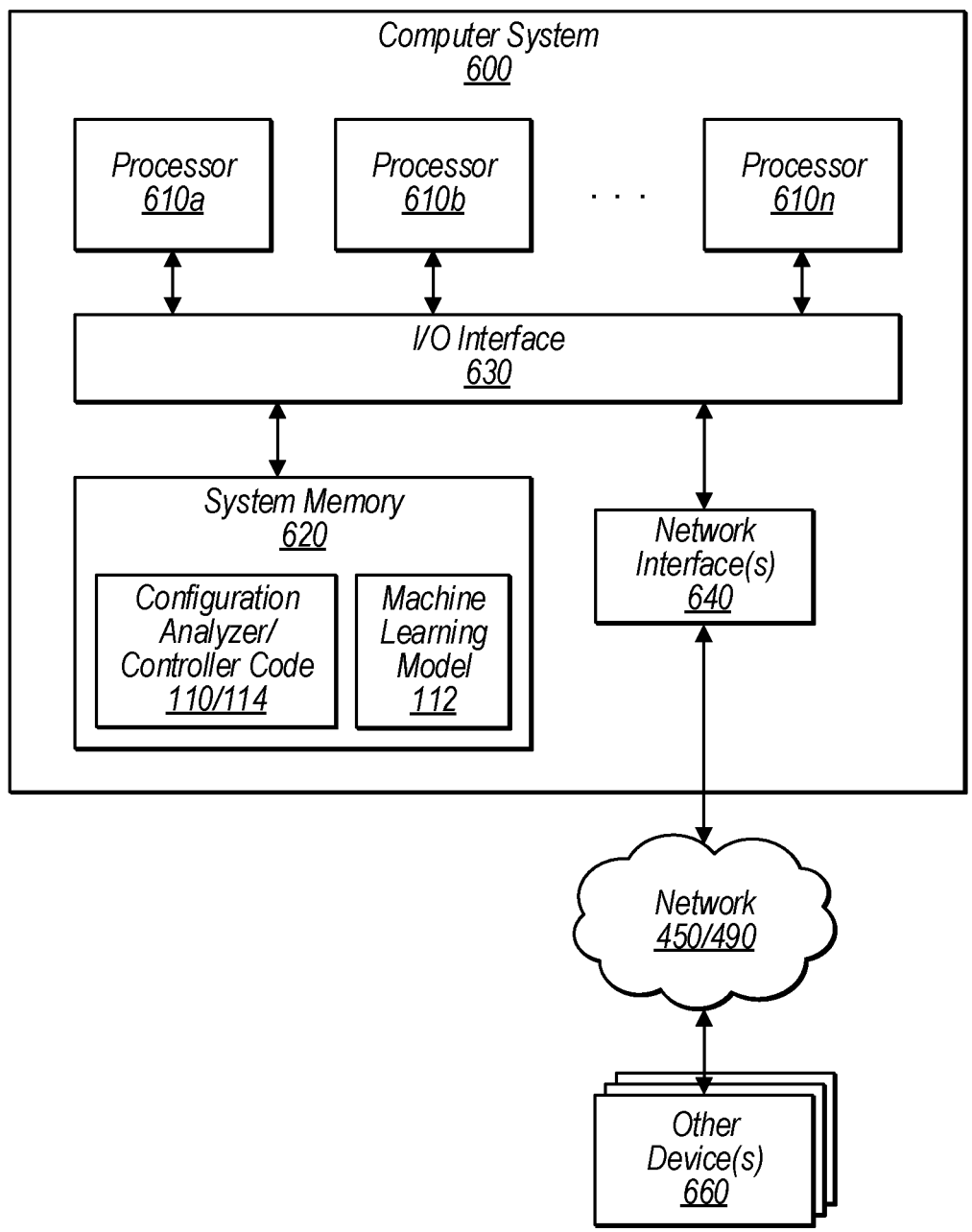
FIG. 6 is a block diagram illustrating a computer system configured to implement at least a portion of a system that implements individual machine configuration based on overall process performance and latent metrics, according to various embodiments.

FIG. 6 is a block diagram that illustrates an example of a computer system, one or more of which may implement various components described and illustrated throughout the disclosure, including one or more components that implement individual machine configuration based on overall process performance and latent metrics, according to embodiments.

Various portions of systems in FIGS. 1 and 4-6 and/or methods presented in FIGS. 2 and 3, described herein, may be executed on one or more computer systems similar to that described herein, which may interact with various other devices of the system.

In the illustrated embodiment, computer system 600 includes one or more processors 610 coupled to a system memory 620 via an input/output (I/O) interface 630. Computer system 600 further includes a network interface 640 coupled to I/O interface 630, and one or more input/output devices 660, such as cursor control device, keyboard, audio device, and display(s). In some embodiments, it is contemplated that embodiments may be implemented using a single instance of computer system 600, while in other embodiments multiple such systems, or multiple nodes making up computer system 600, may be configured to host different portions or instances of embodiments. For example, in one embodiment some elements may be implemented via one or more nodes of computer system 600 that are distinct from those nodes implementing other elements.

In various embodiments, computer system 600 may be a uniprocessor system including one processor 610, or a multiprocessor system including several processors 610 (e.g., two, four, eight, or another suitable number). Processors 610 may be any suitable processor capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

In some embodiments, at least one processor 610 may be a graphics processing unit. A graphics processing unit (GPU) may be considered a dedicated graphics-rendering device for a personal computer, workstation, game console or other computer system. GPUs may be very efficient at manipulating and displaying computer graphics and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the methods disclosed herein for an Identity and Access Management Service that implements persistent source values for assumed alternative identities may be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies, and others.

System memory 620 may be configured to store program instructions and/or data accessible by processor 610. In various embodiments, system memory 620 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing desired functions, such as those described above for individual machine configuration based on overall process performance and latent metrics, are shown stored within system memory 620 as configuration analyzer 114 and data 104/106 (e.g., the cached bot executables and associated information, etc.), respectively. In some embodiments (not illustrated), the Code 110/114 may be the client-side code). In other embodiments, program instructions and/or data may be received, sent, or stored upon different types of computer-accessible media or on similar media separate from system memory 620 or computer system 600. Generally speaking, a computer-accessible medium may include storage media or memory media such as magnetic or optical media, e.g., disk or CD/DVD-ROM coupled to computer system 600 via I/O interface 630. Program instructions and data stored via a computer-accessible medium may be transmitted by transmission media or signals such as electrical, electromagnetic, or digital signals, which may be conveyed via a communication medium such as a network 450 or 490 and/or a wireless link, such as may be implemented via network interface 640. Program instructions may include instructions for implementing the techniques described with respect to any of the FIGS.

In some embodiments, I/O interface 630 may be configured to coordinate I/O traffic between processor 610, system memory 620, and any peripheral devices in the device, including network interface 640 or other peripheral interfaces, such as input/output devices. In some embodiments, I/O interface 630 may perform any necessary protocol, timing, or other data transformations to convert data signals from one component (e.g., system memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components. In addition, in some embodiments some or all of the functionality of I/O interface 630, such as an interface to system memory 620, may be incorporated directly into processor 610.

Network interface 640 may be configured to allow data to be exchanged between computer system 600 and other devices attached to a network, such as other computer systems, or between nodes of computer system 600. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Computing device 600 may include input/output devices that may, in some embodiments, include one or more display terminals, keyboards, keypads, touchpads, scanning devices, voice or optical recognition devices, accelerometers, multi-touch screens, or any other devices suitable for entering or retrieving data by one or more computer system 600. Multiple input/output devices may be present in computer system 600 or may be distributed on various nodes of computer system 600. In some embodiments, similar input/output devices may be separate from computer system 600 and may interact with one or more nodes of computer system 600 through a wired or wireless connection, such as over network interface 640.

Memory 620 may include program instructions (e.g., such as code 110/114), configured to implement embodiments of individual machine configuration based on overall process performance and latent metrics as described herein, and data storage 112, comprising various data (e.g., machine learning models, metrics, configuration settings, or other associated information) accessible by the program instructions 11/114. In one embodiment, program instructions 110/114 may include software elements of a method illustrated in the above figures. Data storage 112 may include data that may be used in embodiments described herein. In other embodiments, other or different software elements and/or data may be included.

Those skilled in the art will appreciate that computer system 600 is merely illustrative and is not intended to limit the scope of as the systems and methods described herein. In particular, the computer system and devices may include any combination of hardware or software that can perform the indicated functions, including computers, network devices, internet appliances, PDAs, wireless phones, pagers, etc. Computer system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 600 may be transmitted to computer system 1200 via transmission media or signals such as electrical, electromagnetic, or digital signals, conveyed via a communication medium such as a network and/or a wireless link. Various embodiments may further include receiving, sending, or storing instructions and/or data implemented in accordance with the foregoing description upon a computer-accessible medium. Accordingly, the present invention may be practiced with other computer system configurations. In some embodiments, portions of the techniques described herein (e.g., individual machine configuration based on overall process performance and latent metrics) may be hosted in a cloud computing infrastructure.

Various embodiments may further include receiving, sending, or storing instructions and/or data implemented in accordance with the foregoing description upon a computer-accessible medium. Generally speaking, a computer-accessible/readable storage medium may include a non-transitory storage media such as magnetic or optical media, (e.g., disk or DVD/CD-ROM), volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The invention claimed is:
1. A system, comprising:
   one or more storage systems comprising:
      a metrics repository for storing individual non-latent metrics including machine-level metrics data for a plurality of machines used together to implement a process that produces physical products and process-level metrics data for the process as-a-whole;

a configuration data repository for storing historical machine configuration setting values for the plurality of machines;

one or more computers comprising respective processors and memory and configured to:

obtain, during a current time period after a production time period during which processing of a physical product is performed and completed, latent metrics data for the completed physical product produced by the processing, wherein the obtained latent metrics data were unavailable during the production time period of the physical product through to immediately subsequent to the production time period and, if the physical product was tested, unavailable through testing of the physical product during and immediately subsequent to the production time period;

access the configuration data repository to determine previous machine configuration setting values for the plurality of machines during the production time period during which the physical product was processed;

provide the machine-level metrics data and the process-level metrics data for the current time period, the latent metrics data for the physical product produced by the process, and the machine configuration setting values during the production time period to one or more machine learning models to determine updated configuration setting values for the plurality of machines; and transmit the updated configuration setting values, determined via the one or more machine learning models based at least in part on the machine-level metrics data, the process-level metrics data for the current time period, the latent metrics data for the physical product produced by the process during the production time period, and the machine configuration setting values during the production time period, to enable the plurality of machines to implement the updated configuration setting values.

2. The system of claim 1, wherein to transmit the updated configuration setting values, the one or more computers are further configured to transmit a recommendation report for the updates to the one or more specified destinations.

3. The system of claim 1, wherein the one or more computers are further configured to:

access an acceptance history of previous updates to machine configuration setting values determined by the one or more machine learning models;

determine whether the acceptance history meets an acceptance threshold; and wherein said transmit the updated configuration setting values is performed responsive to the acceptance history meeting the acceptance threshold and causes configuration settings for one or more of the plurality of machines to be updated automatically.

4. The system of claim 1, wherein the one or more computers are further configured to:

store updates to configuration settings in the configuration data repository, wherein the updates include an indication of a time associated with the updates to the configuration settings.

5. A method, comprising:

performing, by one or more computing devices:

receiving, for a current time period, non-latent metrics including machine-level metrics data for individual ones of a plurality of machines used together to implement a process and process-level metrics data for the process as-a-whole;

receiving one or more latent metrics data for one or more physical products completed by the process during an earlier time prior to the current time period that is subsequent to completion of processing of the physical products, wherein the one or more latent metrics data for the one or more physical products were unavailable during the processing during the earlier period through to immediately subsequent to the processing during the earlier period and, if the physical product was tested, unavailable through testing of the physical product during and immediately subsequent to the processing during the earlier period;

receiving machine configuration setting values for the plurality of machines during the current time period and at the earlier time period;

determining, based on one or more machine learning models, one or more updates to current configuration setting values for the plurality of machines, wherein input to the one or more machine learning models comprises the machine-level metrics data and the process-level metrics data for the current time period, the latent metrics data for the earlier time period, and the machine configuration setting values for the current and earlier time periods; and transmitting the updates to the current configuration setting values to one or more specified destinations.

6. The method of claim 5, wherein the machine-level metrics comprise one or more of:

an output rate of one or more of the machines, an output quality for one or more of the machines, an operating condition for one or more of the machines, or an environmental condition at one or more of the machines.

7. The method of claim 5, wherein the process-level metrics comprise one or more of:

an output rate for the process as-a-whole, an output quality for the process as-a-whole, or an environmental condition for the process as-a-whole.

8. The method of claim 5, further comprising:

receiving, at a data stream storage service, metrics data from a plurality of sensors at respective ones of the plurality of machines or the process; and parsing the data stream to load the machine-level and process-level metrics data into a metrics repository.

9. The method of claim 8, wherein the metrics data are received via one or more network connections to the plurality of sensors.

10. The method of claim 8, wherein the metrics data are received over an Internet connection to a hub device that collects the metrics data from the plurality of sensors.

11. The method of claim 5, wherein the one or more latent metrics data are received from a source remote from the plurality of machines and process.

12. The method of claim 5, wherein the one or more latent metrics data describe one or more latent qualities or defects of the one or more physical products of the process.

13. The method of claim 5, further comprising:

repeating said receiving machine-level metrics data, said receiving one or more latent metrics data, said receiving machine configuration setting values, said determining, and said transmitting for one or more subsequent time periods.

14. The method of claim 5, further comprising:
varying at least some of the configuration setting values for a subsequent time period;
receiving metrics data for the subsequent time period when the configuration setting values have been varied; and
inputting the received metrics data into the one or more machine learning models to search for improvements to the values of the configuration settings.

15. The method of claim 5, further comprising:
performing, as a service for individual ones of a plurality of different processes employing different pluralities of machines, each of said receiving machine-level metrics data, said receiving one or more latent metrics data, said receiving machine configuration setting values, said determining, and said transmitting.

16. The method of claim 5, further comprising:
updating the one or more machine learning models based on previous machine configuration setting values and the latent metrics data to produce one or more updated machine learning models;
determining, based on the updated one or more machine learning models, one or more other updated configuration setting values; and
transmitting the other updated configuration setting values to the one or more specified destinations.

17. One or more non-transitory computer-readable storage media storing program instructions that when executed on or across one or more processors cause the one or more processors to implement a configuration analyzer, configured to perform:
obtaining, for a current time period, non-latent metrics including machine-level metrics data for individual ones of a plurality of machines used together to implement a process and process-level metrics data for the complete process as-a-whole that produces one or more physical products;
obtaining one or more latent metrics data for the one or more physical products of the completed process produced at an earlier time prior to the current time period that is subsequent to completion of the process, wherein the one or more latent metrics data for the one or more physical products of the completed process as-a-whole were unavailable during the processing during the earlier period through to immediately subsequent to the processing during the earlier period and, if the physical product was tested, unavailable through testing of the physical product during and immediately subsequent to the processing during the earlier period;
obtaining machine configuration setting values for the plurality of machines during the current time period and at the earlier time period;
determining, based on one or more machine learning models, one or more updates to current configuration setting values for the plurality of machines, wherein input to the one or more machine learning models comprises the machine-level metrics data and the process-level metrics data for the current time period, the latent metrics data for the earlier time period, and the machine configuration setting values for the current and earlier time periods; and
transmitting the updates to the current configuration setting values to one or more specified destinations.

18. The one or more non-transitory computer-readable media of claim 17, wherein the program instructions cause the one or more processors to perform:
repeating said obtaining machine-level metrics data, said obtaining one or more latent metrics data, said obtaining machine configuration setting values, said determining, and said transmitting for one or more subsequent time periods.

19. The one or more non-transitory computer-readable media of claim 17, wherein the program instructions cause the one or more processors to perform:
varying at least some of the configuration setting values for a subsequent time period;
obtaining metrics data for the subsequent time period when the configuration setting values have been varied; and
inputting the obtained metrics data into the one or more machine learning models to search for improvements to the values of the configuration settings.

20. The one or more non-transitory computer-readable media of claim 17, wherein the program instructions cause the one or more processors to perform:
storing updates to the configuration setting values for one or more subsequent time periods;
receiving metrics data for the one or more subsequent time periods;
determining, based at least in part on the received configuration setting values, to retrain the one or more machine learning models;
retraining the one or more machine learning models;
determining, based on one or more retrained machine learning models, one or more new updates to current configuration setting values for the plurality of machines; and
transmitting the new updates to the current configuration setting values to the one or more specified destinations.

21. The one or more non-transitory computer-readable media of claim 17, wherein the program instructions cause the one or more processors to perform:
storing updates to the configuration settings in a configuration data repository, wherein the updates include an indication of a time associated with the updates to the configuration settings.

22. The one or more non-transitory computer-readable media of claim 17, wherein to transmit the updates to the current configuration setting values the program instructions cause the one or more processors to perform transmitting a recommendation report for the updates to the one or more specified destinations.

\* \* \* \* \*